INVENTOR.
Paul Brix

Patented Aug. 19, 1924.

1,505,319

UNITED STATES PATENT OFFICE.

PAUL BRIX, OF STOCKTON, CALIFORNIA, ASSIGNOR OF ONE-HALF TO OTIS B. HARVEY, OF STOCKTON, CALIFORNIA.

PIE-PAN LIFTER.

Application filed June 24, 1922. Serial No. 570,547.

*To all whom it may concern:*

Be it known that I, PAUL BRIX, a subject of Poland, residing at Stockton, county of San Joaquin, State of California, have invented certain new and useful Improvements in Pie-Pan Lifters; and I do declare the following to be a full, clear, and exact description of the same, reference being had to the accompanying drawings, and to the characters of reference marked thereon, which form a part of this application.

This invention relates to improvements in culinary utensils, the principal object being to provide a device whereby a pie or other similar round pan may be quickly and easily removed from an oven, whether the latter is of the large and deep type used in bakeries, or is of the relatively small size such as are found in ordinary household cooking ranges.

At present, as far as I am aware, bakers have to depend on the flat paddles used successfully when removing bread tins, but which are unsatisfactory when it comes to the removal of pie tins for various reasons which need not be stated here, since they are I believe, appreciated by most bakers. My device eliminates the unsatisfactory features at present incident to pie-pan handling, and its use reduces labor and time in handling, and reduces the possibility of damage to the pie or other confection to a minimum.

This device, when made to be suitable for home use, will also be appreciated by cooks and housewives, who now must remove pie pans from the oven by means of their hands protected by a cloth of some kind, and who constantly run the risk of burning their hands and arms by contact with the hot metal of the oven or pan. This danger is obviated with the use of my improved lifter.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1:
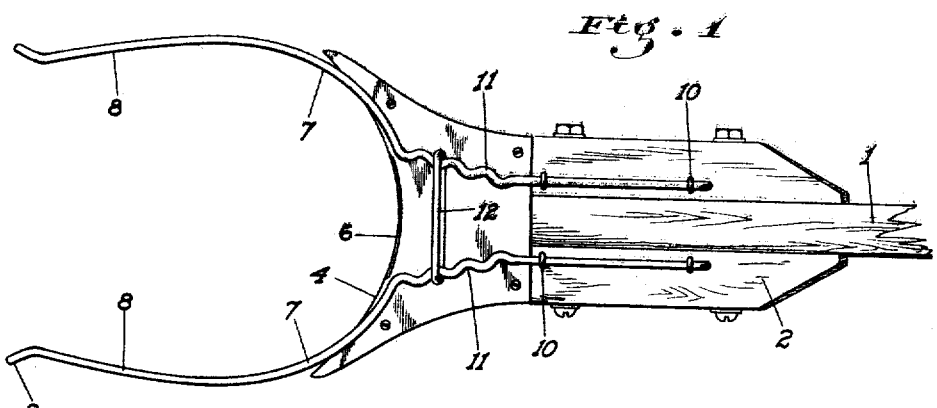
Fig. 1 is a top plan view of a type of lifter adapted for professional bakers' use.
Figure 2:
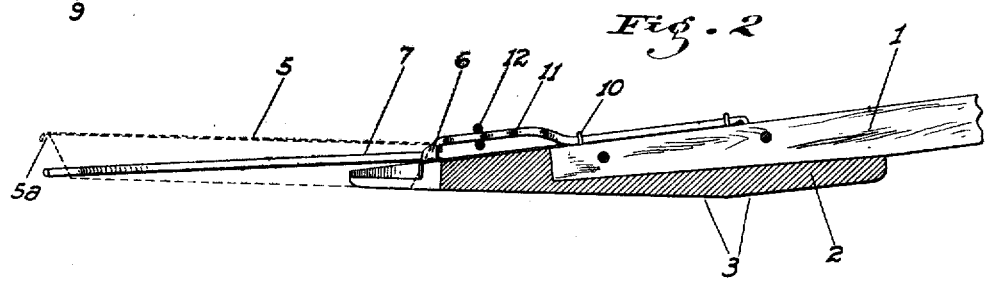
Fig. 2 is a sectional elevation of the device.

Referring now more particularly to the characters of reference on the drawings, and particularly at present to Figs. 1 and 2, the numeral 1 denotes a handle of suitable length (usually from 8 to 10 ft.) on one end of which is secured a substantially flat block 2 whose under side slants outwardly from the ends somewhat as at 3 so as to form a transverse ridge serving as a fulcrum about which the handle may be tilted somewhat in a longitudinal vertical plane, either portion of the block then resting on the floor of an oven.

The outer or forward end of said block, this being the end beyond the handle, is curved as at 4 on a radius substantially equal to that of a pie pan or similar dish 5 while for a certain portion of the extent of the curve a similarly curved flange 6 projects upwardly from the block. The block 2 is preferably of wood, while the flange 6 is bent up from a sheet of metal fixed onto the upper side of the block.

Extending forward of the block 2 and forming substantially a continuation of the curved 4 is a pair of oppositely disposed spring wires 7, which toward their outer ends straighten out to be more or less parallel as at 8, the outer ends being bent away from each other as at 9.

The opposite ends of the curved portions of these wires then pass over the block 2 and are firmly fixed thereto by staples 10 or otherwise a certain distance back of the forward edge of the block, said wires intermediate the staples and the inception of the curve thereof diverging from each other somewhat, such portions being formed with corrugations 11 any corresponding and opposite pair of which at a time being engaged by a loop member 12 straddling said wires. It will therefore be seen that by moving the loop back and forth, the outer ends of the wires may be moved closer together or spread farther apart depending on the size pans being handled, since the tendency of the spring members is to spread apart, which tendency the loop 12 prevents.

In operation, the device is inserted into the oven with the forward under face of the block resting on the oven floor, which causes the wires 7 to slope downwardly, while the flange 6 is then at a height to allow it to pass under the curled-over edge 5ª found about the rim of pans such as 5.

The handle 1 is of course manipulated so as to cause the wires 7 to pass around and engage the sides of the pan desired to be removed, for substantially half the circumference thereof when the forward rim of the pan will be in alinement to be engaged by the flange 6. The handle is then moved down, causing the device to be supported by the rear under portion of the block which in turn causes the wires 7 to be raised, raising the pan 5 from the floor of the oven a trifle and at the same time causing the flange 6 to pass up under the pan-rim 5ª. The handle is then retracted, and the pan removed from the oven, said pan being prevented from tending to slip from the wires and remain in the oven by reason of the cooperating members 6 and 5ª.

Figure 3:
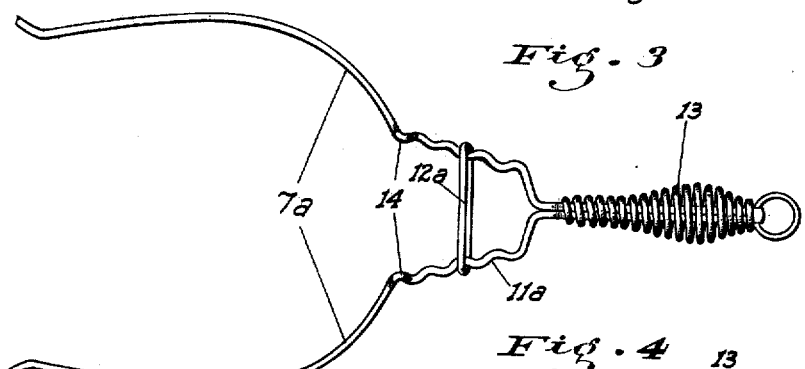
Fig. 3 is a top plan view of a form of the device for household use.
Figure 4:
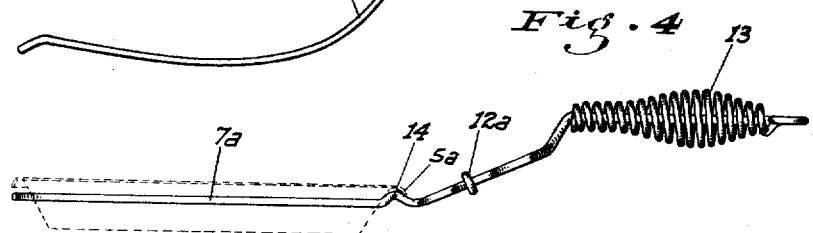
Fig. 4 is a side elevation of the same.

In the form of the device shown in Figs. 3 and 4, the spring-wire pan grasping and retaining members 7ª are directly secured to a short handle 13, while a loop 12ª is arranged with the corrugated portion 11ª of the wire members in the same manner and for the same purpose as has been described with reference to the first type. In the latter type, the block 2 and flange 6 are missing, and to take the place of the latter the wires 7ª are bent upwardly as at 14 to form small peaks or ridges adapted to engage the under side of the pan rim 5ª, these ridges being located at the junction or bend of the curved portion of the wires with the corrugated portions.

The handle on this style of the lifter being so short, the lifter can of course be easily raised with a pan engaged and supported thereby without the need of a rocking or fulcrum support being used, as in the first described type.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A lifter for circular pans having a curled rim-flange comprising a handle, a pair of spring wire members projecting beyond the handle and shaped to engage the outside of the pan for substantially one half the circumference thereof, and means projecting upwardly of the wires for engaging the under side of the rim flange of the pan when the latter is seated between the spring members and pressure is exerted to raise the pan.

2. A lifter for circular pans having a curled rim-flange comprising a handle, a pair of spring wire members projecting beyond the handle and shaped to engage the outside of the pan for substantially one-half the circumference thereof and means acting independently of the spring members whereby when a pan is so engaged and pressure is exerted to lift and withdraw the pan the latter is firmly held against slipping horizontally from between the spring members.

3. A pan lifter comprising a handle, pan engaging members projecting beyond the handle, and parallel thereto, and a transverse fulcrum-ridge provided on the under side of the handle, the vertical distance from the ridge-edge to the top of the pan engaging members being greater than the height of a pan.

4. A lifter for circular pans having a curled rim-flange comprising a handle, and a pair of spring-wire members projecting beyond the handle and shaped to engage the outside of the pan for substantially half the circumference thereof, said wires adjacent the rear terminations of their circular portions being bent upwardly to form peaks to project under the rim-flange.

5. A pan lifter comprising a handle, a pan engaging device projecting beyond one end of the handle, and means provided with the handle adjacent to but ahead of the pan engaging device for enabling the handle to be rocked longitudinally both up and down, while maintaining the handle supported on a plane surface.

6. A pan lifter comprising a handle, a pan engaging device projecting beyond one end of the handle, and a transverse ridge provided under the handle adjacent to but ahead of the pan engaging device.

7. A pan lifter comprising a handle, a pan engaging device projecting beyond one end of the handle, a block secured on that end of the handle beyond which the pan engaging member projects and on which the latter is mounted, the under face of the block sloping downwardly from its ends, whereby to form a transverse fulcrum at the junction of the slopes about which the structure may be tilted longitudinally both up and down.

8. A pan engaging device comprising a handle having a flat surface at its inner end adapted to rest on the floor of an oven, and pan engaging members mounted on the handle and projecting beyond the inner end of the same and in a plane higher than said under surface thereof.

In testimony whereof I affix my signature.

PAUL BRIX.